Jan. 16, 1968
A. DOMINGUEZ
3,363,618
METHOD AND APPARATUS UTILIZING SOLAR THERMAL RADIATION TO
HEAT A FLUID CONTAINED UNDER PRESSURE
Filed June 8, 1965
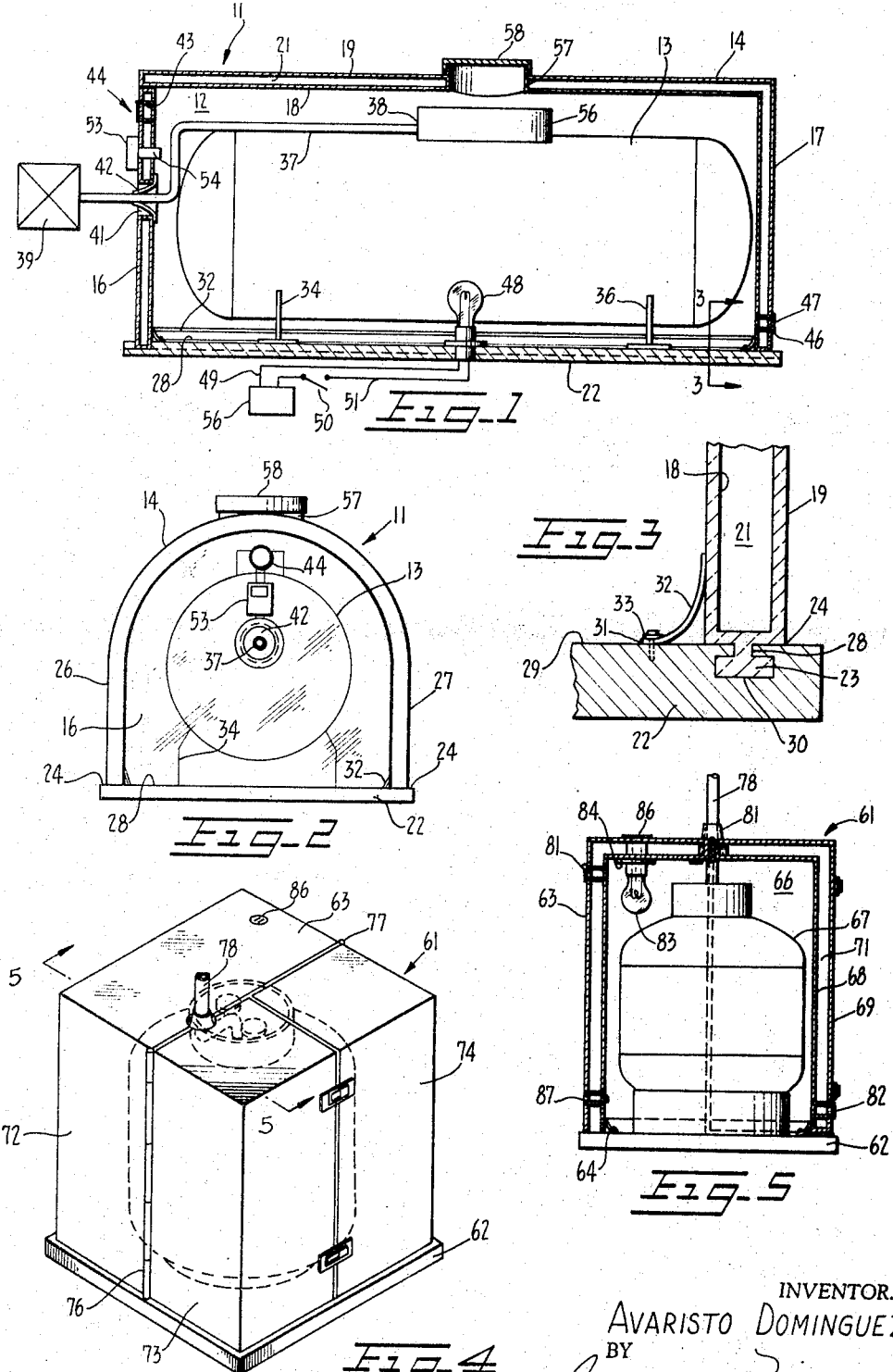
INVENTOR.
AVARISTO DOMINGUEZ
BY
Gardner + Zimmerman
ATTORNEYS

3,363,618
METHOD AND APPARATUS UTILIZING SOLAR THERMAL RADIATION TO HEAT A FLUID CONTAINED UNDER PRESSURE
Avaristo Dominguez, 37866 Vallejo St., Fremont, Calif. 94536
Filed June 8, 1965, Ser. No. 462,195
16 Claims. (Cl. 126—270)

ABSTRACT OF THE DISCLOSURE

The disclosure describes an apparatus which utilizes solar radiation and a dead air space to maintain a pressurized gas within a storage tank or cylinder at a temperature above its boiling point at atmospheric pressure. The apparatus comprises a transparent enclosure for the cylinder or tank. The tank is suspended within the enclosure in spaced relation to the transparent walls thereof and ports are provided through the enclosure to permit ingress and egress of air therefrom as the temperature of such air is changed by solar radiation passing through the transparent walls of the container. A small heat source such as an electric light is also provided within the container to heat the interior thereof when the amount of solar radiation is insufficient to maintain the appropriate temperature.

---

The present invention relates generally to techniques for heating gases. More particularly, it relates to a method and apparatus employing thermal radiation to heat a fluid store in a container under pressure.

Gaseous fluids stored under pressure, such as the liquefied petroleum gases, are used for a variety of purposes. For example, butane and propane gases are extensively employed as fuel for heaters, stoves, and lamps. Also acetylene, butane, and propane gases in combination with oxygen find extensive use in the fusion welding, metal treating and metal cutting crafts.

In the various applications of pressurized gas, it is important that the stored gas be maintained at a temperature above its boiling point at atmospheric pressure. In liquefied petroleum gas sources, the liquefied gas is changed to its gaseous state at the expense of heat stored in the liquefied gas and surroundings. If the temperature of the liquefied gas is allowed to approach its atmospheric pressure boiling point, for example, as a result of the presence of low temperature surroundings, several problems are encountered. Firstly, the vaporization rate is lowered thereby limiting the amount of fuel that can be supplied in a given time interval. Furthermore, since the vapor pressure is reduced as the gas is consumed, oftentimes the vapor pressure of a partially filled gas container will fall to a level too low for extracting the gas remaining therein. Finally, in some cases where low temperature environments are encountered, the gas condenses and accumulates in the outlet gas line forming a blockage to prevent further conduction of gases therethrough.

Besides maintaining the temperature of the gas at least above its atmospheric pressure boiling point, it is desirable to minimize temperature fluctuations of the gaseous fluid of pressurized sources. By so controlling the temperature of the gas, the vapor pressure level and hence the gas flow rate can be stabilized. Where fuel gases are used, for example, with portable gas stove and lamps, such stabilization is particularly desirable in order to assure the issuance of even heat and light therefrom.

Although the maintenance of the gas temperature is important under all circumstances, it becomes a most significant factor where portable gas sources are used at sub-freezing temperature. The importance of such a factor is stressed when it is considered that the atmospheric pressure boiling points of the most common fuel gases, i.e., butane and propane, are approximately zero degree and minus forty-two degrees centigrade respectively. Hence, since the temperature of the container and gas will eventually stabilize to that of its surroundings, it is seen that in using the most common fuel gases the aforementioned problems are encountered at commonly found atmospheric temperature conditions.

Considerable advantage is therefore to be gained by the provision of method and means of maintaining the temperature of a pressurized gas source above a predetermined level to assure a steady and constant flow of gas therefrom. Other advantages will be realized where the heating method and apparatus include the capability of automatically maintaining the temperature of pressurized gas sources above the atmospheric pressure boiling point of the gas.

The present invention provides a method and apparatus utilizing thermal radiation from the sun and a dead air space to accomplish the foregoing and thereby overcome many of the limitations associated with the use of pressurized gas sources at freezing and sub-freezing temperatures. More particularly in the heating method of the present invention, a container for storing gas under pressure is surrounded by a dead air space. The dead air space may be provided by disposing the container within a substantially gas tight housing. The terminology "substantially gas tight" is used herein to designate a degree of seal which obstructs heat transfer by convection currents. Towards heating the gas within the container, thermal radiation from the sun is directed to impinge the container. Where the container is disposed within a closed housing, the housing is provided with a thermal radiation pervious wall portion in receiving relationship to the solar thermal radiation. By surrounding the gas container with a dead air space, the heat transfer from the container to its surroundings by thermal convection is essentially eliminated while the heat transfer by thermal conduction is small since gases are poor conductors of heat. However, the dead air space will be pervious to thermal radiation. Consequently, where low temperature environmental conditions are encountered, the thermal radiation from the sun will heat the container disposed within the housing while the surrounding dead air space prevents the rapid heat loss therefrom by thermal convection and conduction phenomenon. Hence, the gas container can be kept at a temperature higher than that of the surrounding environment.

In some cases it may be desirable to supplement the heating accomplished by the sun. In those instances, the gas stored in the container may be further heated by directing thermal energy from an artificial source to impinge on the container.

The present invention also includes a solar furnace in which the foregoing method may be conducted. The furnace comprises a substantially gas tight housing having a wall portion pervious to thermal radiation. The housing is adapted to receive a pressurized gas container and support it therein in spaced relation to the interior surface of the housing. In order to convey the gas stored in the container to the exterior of the housing, a wall of the housing is adapted to define an aperture having a substantially gas tight seal mounted therein. The seal is apertured to receive therethrough in sealing relation a pressurized gas transmitting conduit. When extremely low temperature environments are encountered and it is desired to maintain continuously the gas temperature above a minimum level, it is contemplated that the furnace will be adapted to receive a temperature sensing means and an artificial thermal radiation source to afford the means of selectively supplying additional heat to the container.

Accordingly it is an object of the present invention to provide a method and apparatus for heating a fluid stored in a container under pressure.

More particularly it is an object of the present invention to provide a method and apparatus utilizing solar thermal radiation to heat a fluid stored in a container under pressure.

It is another object of the present invention to provied a method and apparatus for maintaining a liquified petroleum fuel gas stored under pressure at a temperature at least above its atmospheric pressure boiling point.

It is yet a more particular object of the present invention to provide a portable liquified petroleum fuel system adaptable for use in temperature environments below freezing.

It is still a further object of the present invention to provide a portable liquefied petroleum fuel system capable of supplying fuel continuously in temperature environments below freezing.

Additional objects and advantages of the present invention will be apparent upon consideration of the following description taken in conjunction with the accompanying drawings, of which:

FIGURE 1 is a cross sectional view of one embodiment of the solar furnace of the present invention.

FIGURE 2 is a plan view of the end of the solar furnace of FIGURE 1 through which the gas is extracted from the container mounted within the furnace.

FIGURE 3 is an enlarged cross sectional view taken along line 3—3 of FIGURE 1 illustrating the substantially gas tight joint between the envelope and platform of the furnace of FIGURE 1.

FIGURE 4 is an isometric view of a second embodiment of the solar furnace of the present invention.

FIGURE 5 is a cross sectional view of the furnace of FIGURE 4 taken along line 5—5.

Considering now the method of the present invention as practiced to heat a fuel gas, such as butane or propane liquefied petroleum gas, a pressurized fuel gas container is surrounded with a dead air space. As set forth hereinbefore, the dead air space is characterized by not transferring any substantial amount of heat by thermal convection, having a low thermal conductivity, and simultaneously being pervious to thermal radiation. Hence, the dead air space serves to insulate the gas container and therefore the gas contained therein, against rapid heat losses to the external environment. To establish such a surrounding dead air space, the gas container is disposed in a substantially gas tight housing.

The housing is provided with a thermal radiation pervious wall portion through which thermal radiation from the sun is directed to impinge the gas container disposed therein. It is particularly advantageous for the gas container to receive the thermal radiation for the maximum possible period. Therefore, it is contemplated that the housing will be constructed and adapted to afford maximum utilization of the solar thermal radiation. This may be accomplished, for example, by constructing the housing entirely from glass. Alternatively the housing may be provided with a thermal radiation pervious window through which solar thermal radiation is directed by a lens system adapted to track the sun during the day.

In some cases it may be desired to supplement the heating obtained from the sun by artificial sources. For example, where extremely low environmental temperature conditions are encountered, i.e., sub-freezing temperatures, the heat losses, although small, in the absence of the sun may be sufficient to lower the temperature of the contained fuel gas to a level undesirable for use. To render the gas suitable for use under such conditions, thermal energy from an artificial source is directed to impinge the gas container. Any of the many conventional artificial thermal energy sources can be incorporated into the practice of the method of the present invention. However, because of cleanliness and simplicity, it is found to be most advantageous to use an electrical heating means mounted within the housing as the artificial thermal energy source.

Toward affording a most efficient means of adjusting the temperature of the gas container by the artificial thermal energy source, it is contemplated that a particular method of the present invention includes the steps of sensing the temperature of the gas stored in the container. Responsive to a predetermined temperature level of the gas, the artificial energy source is energized to direct the requisite thermal energy to heat the gas. Preferably such steps would be accomplished automatically by disposing a conventional thermocouple in thermal communication with the interior of the housing. The thermocouple would be serially electrically connected between the artificial source and its energizing supply, and would respond to a predetermined temperature level of the housing interior to allow the supply to energize the artificial source.

Considering now one embodiment of the solar furnace of the present invention as illustrated in FIGURES 1, 2 and 3, a housing 11 defines a dead air space interior region 12 for receiving therein a pressurized fluid container 13 in spaced relation to the interior walls of housing 11. Specifically, housing 11 comprises a U-shaped envelope 14 including first and second end walls 16 and 17 joined respectively at opposite ends of envelope 14. Envelope 14 is constructed to have an inner glass wall 18 and a spaced conforming outer glass wall 19 joined at their respective peripheries to define a dead air space region 21 therebetween. End wall 16 of envelope 14 is removably press fittingly joined thereto in substantially gas tight relation to provide an access for container 13 to interior 12 of housing 11.

U-shaped envelope 14 is joined to a platform 22 in slidable substantially gas tight relation to define the dead air space interior region 12. With particular reference to FIGURES 1 and 3, the joining of envelope 14 and platform 22 is accomplished by providing envelope 14 with T-shaped projections 23 at the terminal edge 24 of parallelly aligned side walls 26 and 27 respectively. The stem 28 of T-shaped projection 23 is joined to the terminal edge 24 of the side walls. The surface 29 of platform 22 facing envelope 14 is provided with T-shaped channels 30 aligned to slidably receive the T-shaped projections 23. To insure that a substantially gas tight seal is obtained between platform 22 and envelope 14, a first end 31 of a resilient member 32, e.g., rubber, is secured to surface 29 of platform 22 proximate the entire juncture of envelope 14 and platform 22. The resilient member 31 is formed to curve convexly away from surface 29 and pressingly contact at a second end 33 thereof the inner surface of envelope 14. The pressing resilient member 32 acts to obstruct the passage of convection currents through the juncture of envelope 14 and platform 22 thereby maintaining interior region 12 as a dead air space.

The fuel gas container 13 is inserted through the opening created by removing end wall 16 from envelope 14 and supported within housing 11 by cradle support members 34 and 36 secured to surface 29 of platform 22. To extract the gas from container 13 and convey it exteriorly to housing 11, a pressurized gas conduit 37 is communicated at a first end 38 via a container gas control valve (not shown) to the interior of container 13. The conduit extends from container 13 to sealingly transpierce side wall 16 to connect to a gas control valve 39 mounted exteriorly to envelope 14. To provide a channel through side wall 16 for conduit 37, an aperture 41 is provided within wall 16. An apertured resilient seal 42 is mounted within aperture 41 in gas tight relation thereto. The aperture size of seal 42 is selected to be smaller than the diameter of conduit 37 so that when conduit 37 is inserted therethrough, the material of seal 42 will pressingly surround conduit 37 thereby forming a substantially gas tight seal therearound.

To protect against a pressure build up within interior region 12 of housing 11 due to gas leakage from container 13, housing 11 is adapted with suitable overpressure relief valve means. As shown in FIGURES 2 and 3, the upper portion of end wall 16 is provided with a port 43 extending therethrough. Port 43 is covered by a hinged flap 44 which is responsive to overpressure conditions within housing 11 to allow gas to flow through port 43. To facilitate the rapid removal of gas from the envelope interior 12, a second overpressure relief valve including a port 46 defined by the lower portion of end wall 17 and hinged flap 47 is adapted to housing 11.

To provide an artificial source of thermal energy for heating container 13, an electric lamp 48, e.g., a conventional 50 watt house lamp, is mounted on surface 29 of platform 22. Lamp 48 is provided with electrical leads 49 and 51 which connect the lamp through housing 11 to a power supply 52 located outside housing 11.

Control of the delivery of power to lamp 48 is accomplished by a temperature sensing means 53 mounted in end wall 16 in thermal communication with envelope interior 12. Where manual control is adequate, sensing means 53 may be a thermometer. However, where automatic control is desired, a thermocouple switch type sensing means 53 would be disposed to have its temperature sensitive element 54 in thermal communication with interior 12 and its electrical switch element 56 serially interposed the current path, e.g., in lead 51, between lamp 48 and supply 52.

In order to gain access to the refueling ports and container control valves mounted beneath an enclosure 56 of gas fuel container 13, envelope 14 is provided with an inlet port 57 and cap 58 in alignment with enclosure 56. In removing container 13 from housing 11, container 13 is valved off at the container valve (not shown) and conduit 37 disconnected from container 13. End wall 16 is then removed and container 16 withdrawn therethrough. When container 13 is refueled while within housing 11, it is accomplished in standard ways through inlet port 57.

The above described solar furnace is particularly adapted to receive and heat fuel gas retained in horizontally oriented pressurized containers. Now, with reference to FIGURES 4 and 5 a second embodiment of the solar furnace of the present invention is shown which is particularly adapted to receive and heat fuel gas retained in vertically oriented pressurized containers. In the second embodiment, the solar furnace comprises a rectangular cubic hollow housing 61 including a base platform 62 and a rectangular hollow cubic glass envelope 63 having one open side. Envelope 63 is mounted to platform 62 in substantially gas tight relation with its open end facing platform 62. The substantially gas tight seal between platform 62 and envelope 63 is accomplished by securing a convexly curving resilient member 64 in pressing relationship between interior surface portions of platform 62 and envelope 63 proximate and along the entire juncture of platform 62 and envelope 63. The platform 62, envelope 63, and resilient member 64 define dead air space interior region 66 for receiving a pressurized fuel gas container 67 and supporting it on platform 62 in spaced relation to the walls of the envelope 63. While not shown, suitable receiving means, such as brackets with straps thereon, are desirably provided to hold the contaner 67 immovably within solar furnace 61. In order to more effectively insulate container 67 from the effects of the surrounding atmosphere, envelope 63 is constructed to have an inner and outer nested walls 68 and 69 respectively separated by a dead air space 71. Access to interior 66 of solar furnace 61 is provided by adapting envelope 63 with a side that can be removed. As shown in FIGURE 4, envelope 63 is adapted to include a stationary vertical half section 72, and a first and second vertical quarter sections 73 and 74. Sections 73 and 74 are joined respectively by hinges 76 and 77 to opposite vertical sides of section 72 and close therewith in substantially gas tight relation to define the dead air space interior region 66.

Gas is delivered from container 67 to its point of use via conduit 78 which sealingly transpierces envelope 63 through an apertured seal 81 mounted at the unhinged common junction of section 72 and 73 of envelope 63.

In addition, overpressure relief valve means 81 and 82, of the type described hereinbefore with reference to FIGURE 1, are mounted respectively in opposing walls of envelope 63, one near the top and one near the bottom thereof.

A supplementary source of thermal energy is supplied to heat container 67 by an electric lamp 83 which is secured by a receptacle 84 to the top of the stationary section 72 of envelope 63. Receptacle 84 includes a terminal means 86 which extends through to the outside of envelope 63 and provides the means for connecting a suitable energizing source to lamp 83. The energization of lamp 83 may be controlled automatically by mounting a thermocouple switch 87 in thermal conducting relation to interior 66. Thermocouple switch 87 is provided with terminals for connecting it in electrical series with lamp 84. Thermocouple switch 87 responds to a predetermined temperature level of interior region 66 to allow lamp 84 to be energized.

While the present invention has been described in terms of specific steps of a method and two particular embodiments numerous modifications and variations are possible within the spirit and scope of the invention. For example, the housing surrounding the fuel gas container may be of any geometrical shape. The only requirements imposed on the housing is that it have at least a part of its walls pervious to thermal radiation and that it define a substantially gas tight interior region. Additionally, the thermal radiation pervious wall of the housing may be constructed from material other than glass, for example, plastic.

Furthermore, artificial thermal radiation sources other than a single electric lamp may be adapted to use in the system of the present invention. For example, resistance wire could be positioned at various locations within the housing. Also resilient material other than rubber can be employed to provide the desirable sealing characteristics, for example, silicone, polypropylene as well as other plastics. Finally, other overpressure relief valve means can be employed in the present invention. Such other valves could be capped ports or any pressure responsive type valve.

Therefore, the scope of the invention is not intended to be limited except by the terms of the claims.

What is claimed is:

1. A solar furnace for heating a fluid stored in a container under pressure comprising,
   (a) a substantially gas tight housing having a wall portion pervious to thermal radiation from the sun adapted to receive and support said container therein in spaced relation to an interior surface of said housing to intercept said solar thermal radiation penetrating to the interior of said housing;
   (b) a conduit suitable for conveying a gas under pressure having a first end adapted to communicate in gas flow relation to the interior of said container and a second end sealingly transpiercing to the exterior of said housing, and
   (c) an overpressure valve means mounted in a wall of said housing to provide a gas flow path from the interior to the exterior of said housing when the pressure within said housing attains a predetermined level.

2. The solar furnace according to claim 1 further comprising an electrical heater adapted to be energized by a power supply disposed in thermal conducting relation to the interior region defined by said housing.

3. The solar furnace according to claim 2 further comprising a temperature sensing means electrically interposed said power supply and electrical heater responsive 3,363,618 to a predetermined temperature level of the interior of said housing to allow said electrical heater to be energized by said power supply.

4. The solar furnace recited in claim 1 further defined by said overpressure valve means including
   (a) a first hinged flap disposed in covering relation to a first port defined by a wall of said housing, and
   (b) a second hinged flap disposed in covering relation to a second port defined by a wall of said housing, said first and second flaps hinged to be normally in covering relation to their respective ports and responsive to overpressure conditions within said housing to allow gas flow through said first and second ports.

5. A solar furnace for heating a fluid stored in a container under pressure comprising
   (a) a platform having a side defining a channel,
   (b) an envelope pervious to thermal radiation from the sun defining at least one open side and having a second side adapted to be opened to receive said container therethrough,
   (c) a projection integrally attached to and extending from the peripheral edge of said envelope defining said opened side, said projection formed to join with said channel in substantially gas tight slidable relation, said joined envelope and platform defining an interior region to receive said container therein in spaced relation to said envelope,
   (d) means for supporting said container within said interior region,
   (e) a conduit suitable for conveying a gas under pressure having a first end adapted to communicate in gas flow relation to the interior of said container and a second end sealingly transpiercing to the exterior of said envelope, and
   (f) an overpressure valve means mounted in a wall of said envelope to provide a gas flow path from said interior region to the exterior of said envelope when the pressure of said interior region attains a predetermined level.

6. The solar furnace recited in claim 5 further defined by
   (a) said platform side defining first and second parallelly aligned T-shaped channels, the stem of said T-shaped channels terminating at the surface of said platform side, and
   (b) said projection including first and second parallelly aligned T-shaped extensions with their respective stems integrally joined to spaced portions of the peripheral edge of said envelope.

7. The solar furnace according to claim 6 further comprising a curved resilient member having a first end mounted in substantially gas tight relation to said platform proximate the entire junction of said envelope and platform, said member curving convexly away from said platform to pressingly contact at a second end thereof said envelope to form a substantially gas tight joint between said envelope and platform.

8. The solar furnace according to claim 5 further comprising an electrical heater adapted to be energized by a power supply disposed in thermal conducting relation to said interior region.

9. A solar furnace for heating and maintaining a fuel gas stored in a container under pressure at a temperature above its atmospheric pressure boiling point comprising,
   (a) a U-shaped housing having parallelly extending side and end walls comprising an inner glass wall and a spaced conforming outer glass wall sealingly joined together at their respective peripheries to define a dead air space therebetween, one of said end walls of said housing removably mounted for receiving said container therethrough,
   (b) first and second T-shaped projections each integrally joined at their respective stems to the periphery of separate side walls,
   (c) a rectangular platform having a planar side defining spaced apart parallel T-shaped channels for slidably receiving said T-shaped projections to join said housing and platform and define an interior region for receiving said container therein in spaced relation to said housing,
   (d) means for supporting said container within said interior region,
   (e) a curved resilient member having a first end mounted in substantially gas tight relation to said platform proximate the entire juncture of said housing and platform, said member curving convexly away from said platform to pressingly contact at a second end thereof said housing to form a substantially gas tight joint between said housing and platform,
   (f) a conduit suitable for conveying a gas under pressure having a first end adapted to communicate in gas flow relation to the interior of said container and a second end sealingly transpiercing to the exterior of said housing,
   (g) a first hinged flap disposed in covering relation to a first port defined by the upper part of one of said end walls,
   (h) a second hinged flap disposed in covering relation to a second port defined by the lower part of the remaining end wall, said first and second flaps hinged to be normally in covering relation to their respective ports and responsive to over-pressure conditions within said housing to allow gas flow through said first and second ports,
   (i) an electric light and receptacle mounted to said platform within said interior region having electrical leads extending to the exterior of said housing for connecting said light to a power supply, and
   (j) temperature sensing means mounted in thermal conducting relation with said interior region.

10. The solar furnace as recited in claim 9 further defined by said temperature sensing means being a thermometer.

11. The solar furnace as recited in claim 9 further defined by said temperature sensing means being a thermocouple electrically interposed said power supply and light responsive to a predetermined temperature level of said interior region to allow said light to be energized by said power supply.

12. The solar furnace as recited in claim 9 as particularly adapted to be employed with pressurized fuel gas containers having refueling ports further defined by said U-shaped housing defining an inlet port aligned with said refueling port, and a cap disposed to cover said inlet port in substantially gas tight relation.

13. A solar furnace for heating and maintaining a fuel gas stored in a container under pressure at a temperature above its atmospheric pressure boiling point comprising;
   (a) a rectangular hollow cubic housing comprising,
      (1) a base platform for supporting said container,
      (2) a glass rectangular hollow cubic envelope having one open side mounted to said platform in substantially gas tight relation with its open side in facing relation thereto to define an interior region for receiving said container in space relation to the envelope, said envelope including an inner glass wall and a spaced conforming outer glass wall sealingly joined together at their respective peripheries to define a dead air space therebetween, one side of said envelope adapted to be opened to receive said container therethrough,
   (b) a first hinged flap disposed in covering relation to a first port defined by the upper part of a first side of said envelope,
   (c) a second hinged flap disposed in covering relation to a second port defined by the lower part of a side of said envelope opposite said first side, said first and second flaps hinged to be normally in covering relation to their respective ports and responsive to overpressure conditions within said housing to allow gas flow through said first and second ports,
(d) a conduit suitable for conveying a gas under pressure having a first end adapted to communicate in gas flow relation to the interior of said container and a second end sealingly transpiercing said envelope to the exterior of said housing,
(e) an electric light and receptacle mounted within said housing having electrical leads extending to the exterior of said housing for connecting said light to a power supply, and
(f) temperature sensing means mounted in thermal conducting relation with said interior region.

14. The solar furnace as recited in claim 13 further defined by said envelope comprising a stationary vertical half section and first and second vertical quarter sections, said first and second quarter sections joined by hinges to opposite vertical sides of said half section for opening said housing to receive said container therein, and said conduit sealingly transpiercing said envelope at an unhinged common junction of said half section and at least one of said quarter sections.

15. A method of heating and maintaining a fuel gas stored under pressure in a container at a temperature above its atmospheric pressure boiling point, the steps comprising,
(a) surrounding said container with a confined dead air space,
(b) directing thermal radiation from the sun to impinge said fuel gas container,
(c) sensing the temperature of said dead air space, and
(d) selectively directing in response to a predetermined temperature level of said dead air space thermal energy from an artificial source to impinge said fuel gas container.

16. A solar furnace for heating a fluid stored in a container under pressure comprising,
(a) a substantially gas tight glass housing having a wall portion pervious to thermal radiation from the sun adapted to receive and support said container therein in spaced relation to an interior surface of said housing to intercept said solar thermal radiation penetrating to the interior of said housing, a wall of said housing defining an aperture,
(b) a substantially gas tight seal mounted in sealing relation within said aperture, said seal adapted to receive in sealing relation therethrough a rod like member and
(c) an overpressure valve means mounted in a wall of said housing to provide a gas flow path from the interior to the exterior of said housing when the pressure within said housing attains a predetermined level.

References Cited

UNITED STATES PATENTS

| | | | |
|---|---|---|---|
| 1,068,650 | 7/1913 | Harrison | 126—271 |
| 1,101,000 | 6/1914 | Willsie | 126—271 X |
| 2,122,821 | 7/1938 | Mohr | 126—271 |
| 2,506,721 | 5/1950 | Kluck | 62—50 X |
| 2,655,792 | 10/1953 | Lagrange. | |
| 2,969,637 | 1/1961 | Rowekamp | 126—271 X |

CHARLES J. MYHRE, *Primary Examiner.*